United States Patent
Chen et al.

(10) Patent No.: US 10,243,990 B1
(45) Date of Patent: Mar. 26, 2019

(54) SYSTEMS AND METHODS FOR DETECTING REPLAY ATTACKS ON SECURITY SPACE

(71) Applicant: Apple Inc., Cupertino, CA (US)

(72) Inventors: Zhimin Chen, San Jose, CA (US); Timothy R. Paaske, Cupertino, CA (US); Gilbert H. Herbeck, Austin, TX (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 15/275,044

(22) Filed: Sep. 23, 2016

(51) Int. Cl.
G06F 21/64 (2013.01)
H04L 29/06 (2006.01)
G06F 21/60 (2013.01)

(52) U.S. Cl.
CPC ........ H04L 63/1466 (2013.01); G06F 21/602 (2013.01); G06F 21/64 (2013.01); H04L 63/1475 (2013.01); G06F 2221/2151 (2013.01)

(58) Field of Classification Search
CPC . H04L 63/1466; H04L 63/1475; G06F 21/64; G06F 21/602; G06F 2221/2151
See application file for complete search history.

(56) References Cited

U.S. PATENT DOCUMENTS

| | | | |
|---|---|---|---|
| 8,924,740 B2 | 12/2014 | Yu | |
| 9,405,917 B2 | 8/2016 | Horne | |
| 9,959,418 B2 * | 5/2018 | Bhattacharyya | G06F 21/62 |
| 2004/0143710 A1 * | 7/2004 | Walmsley | B41J 2/04505 711/144 |
| 2010/0088528 A1 * | 4/2010 | Sion | G06F 21/64 713/193 |
| 2012/0079283 A1 * | 3/2012 | Hashimoto | G06F 12/1425 713/189 |

(Continued)

OTHER PUBLICATIONS

B. Rogers, S. Chhabra, M. Prvulovic and Y. Solihin, "Using Address Independent Seed Encryption and Bonsai Merkle Trees to Make Secure Processors OS- and Performance-Friendly," 40th Annual IEEE/ACM International Symposium on Microarchitecture (MICRO 2007), Chicago, IL, 2007, pp. 183-196.*

(Continued)

Primary Examiner — Lisa C Lewis
Assistant Examiner — Zhimei Zhu
(74) Attorney, Agent, or Firm — Meyertons Hood Kivlin Kowert and Goetzel PC; Rory D. Rankin

(57) ABSTRACT

A system and method for detecting replay attacks on secure data are disclosed. A system on a chip (SOC) includes a security processor. Blocks of data corresponding to sensitive information are stored in off-chip memory. The security processor uses an integrity data structure, such as an integrity tree, for the blocks. The intermediate nodes of the integrity tree use nonces which have been generated independent of any value within a corresponding block. By using only the nonces to generate tags in the root at the top layer stored in on-chip memory and the nodes of the intermediate layers stored in off-chip memory, an amount of storage used is reduced for supporting the integrity tree. When the security processor detects events which create access requests for one or more blocks, the security processor uses the integrity tree to verify a replay attack has not occurred and corrupted data.

20 Claims, 8 Drawing Sheets

(56) References Cited

U.S. PATENT DOCUMENTS

| | | | | |
|---|---|---|---|---|
| 2014/0040632 | A1* | 2/2014 | Chhabra | G06F 21/64 |
| | | | | 713/189 |
| 2015/0334114 | A1* | 11/2015 | Scarlata | G06F 21/62 |
| | | | | 713/170 |
| 2016/0224099 | A1* | 8/2016 | Shen | G06F 1/3275 |
| 2016/0283405 | A1* | 9/2016 | Oh | G06F 12/1408 |
| 2016/0283750 | A1* | 9/2016 | Durham | G06F 21/79 |
| 2016/0328335 | A1* | 11/2016 | Bhattacharyya | G06F 12/1408 |
| 2016/0379015 | A1* | 12/2016 | Samsonov | G06F 21/6209 |
| | | | | 713/193 |
| 2017/0024573 | A1* | 1/2017 | Bhattacharyya | G06F 21/64 |
| 2017/0083724 | A1* | 3/2017 | Chhabra | G06F 21/72 |
| 2017/0091119 | A1* | 3/2017 | Chhabra | G06F 12/0802 |
| 2017/0230179 | A1* | 8/2017 | Mannan | H04L 9/0897 |
| 2017/0288874 | A1* | 10/2017 | Narendra Trivedi | |
| | | | | H04L 9/3234 |
| 2017/0302645 | A1* | 10/2017 | Ducker | H04L 63/08 |
| 2018/0026791 | A1* | 1/2018 | Bohli | H04L 9/3239 |

OTHER PUBLICATIONS

Sierra et al., U.S. Appl. No. 15/202,269, entitled "Return-Oriented Programming (ROP)/Jump Oriented Programming (JOP) Attack Protection", filed Jul. 5, 2016, 27 pages.

* cited by examiner

SYSTEMS AND METHODS FOR DETECTING REPLAY ATTACKS ON SECURITY SPACE

BACKGROUND

Technical Field

Embodiments disclosed herein are related to computing systems, and more particularly, to detecting replay attacks on secure data.

Description of the Relevant Art

With each generation, semiconductor chips provide more functionality and performance. For example, the semiconductor chips include superscalar processing of instructions, out-of-order and speculative execution of instructions, simultaneous multi-threading, and sufficient on-die real estate to include multiple processing units and logic for processing instructions and transactions from various sources. The multiple processing units may be individual blocks or individual dies on an integrated circuit (IC), such as a system-on-a-chip (SOC). Alternatively, the multiple processing units may be individual blocks or individual dies within a package, such as a multi-chip module (MCM). Further, the multiple processing units may be individual blocks or individual dies or chips on a printed circuit board.

The chips described above may be found in a variety of computing devices. For example, such computing devices may include smartphones, tablet computers, laptop computers, nettop computers, personal digital assistants (PDAs), smart watches, other wearable electronics, gaming devices, appliances, and so on. These computing devices have significant processing capability and are increasingly being used for financial management and financial transactions, email, web browsing, and other activities that may involve private user data. Accordingly, the security of these computing devices, and their ability to resist or detect attacks meant to compromise secure data, is becoming increasingly important.

In various embodiments, one of the multiple processing units in a computing device may be a dedicated security processor. As the amount of on-die real estate may be limited for on-chip memory, such as static random access memory (SRAM), only a small amount of memory may be available to the security processor on chip. In such a case, it may be necessary to store some portion of the security information off chip. In an attempt to prevent attacks on secure data, the security processor may use one of many available encryption techniques to protect the secure data stored in off-chip memory.

In addition to cryptography, the security processor may use authentication techniques to detect modified data in the off-chip memory. However, attackers may use a variety of tactics to eavesdrop on transactions between the security processor and the off-chip memory, or simply read the contents of the off-chip memory. Additionally, after eavesdropping on a valid transaction, the attackers may generate new transactions based on the eavesdropped transactions. These "replay attacks" may allow the overwriting and/or generating of transactions for malicious intent based on information gained from the eavesdropped transactions.

In view of the above, methods and mechanisms for detecting replay attacks on secure data are desired.

SUMMARY OF EMBODIMENTS

Systems and methods for detecting replay attacks on secure data are contemplated. In various embodiments, a system on a chip (SOC) includes a dedicated security processor, which stores data in an on-chip memory. The on-chip memory may be on-die static random access memory (SRAM). The on-chip memory may have a higher security level than any off-chip memory. The off-chip memory may include local and/or remote memory, such as dynamic random access memory (DRAM), dimms, solid state storage devices, hard disk drives and so forth. The security processor additionally stores data in off-chip memory.

The security processor may encrypt blocks of data stored in the off-chip memory. Each block may correspond to a portion of a file, an entire file, or a set of files. In various embodiments, the files may correspond to secure data such as financial management data, user communication data, received sensitive data from other people or organizations, and secure boot process data. The security processor may or may not encrypt error detection data corresponding to the blocks. Such error detection data may include tags based at least in part on a corresponding block. The error detection data may also include generated keys, keys supplied by an external source, and/or wrapped keys which are keys encrypted by another key supplied by an external source. Additionally, one or more nonces are included which have been generated independent of any value within a corresponding block. In some embodiments, the one or more nonces are arbitrary values that may only be used once. These nonces may also be used to provide an indication of a time reference (relative to other nonces) when blocks are created and modified. Alternatively, the nonces may be timestamp values.

The security processor may use an integrity data structure for the blocks stored in the off-chip memory. In various embodiments, the integrity data structure is an integrity tree. The blocks stored in the off-chip memory may be (or include) the leaf nodes of the integrity tree or the lowest level of the integrity tree. Nodes further up in the integrity tree include values dependent upon other values stored in nodes in lower levels. In some embodiments, two or more data blocks are in a same node. A node with one or more data blocks may include a generated tag for the one or more data blocks. An algorithm may receive as inputs at least one or more blocks of the one or more leaf nodes and a respective nonce. Each time one of the one or more blocks of the one or more leaf nodes is created or updated, the respective nonce(s) may be updated too.

If the integrity tree has more than two levels, each node in each intermediate layer includes a tag based on the one or more nonces of the one or more lower level nodes but not from the output tags or the blocks of the lower level nodes. The top level tag, or the root, may be based on the one or more nonces at the highest level of the integrity tree below the root. However, the root is not based on any value in any of the data blocks in the leaf nodes at the lowest level of the integrity tree.

In various embodiments, the root is stored in on-chip memory while the lower levels of the integrity tree are stored in off-chip memory. In other embodiments, both the root and a copy of the nonces at the one or more highest levels of the integrity tree below the root are stored in on-chip memory. By using nonces from the nodes of the intermediate levels of the integrity tree for producing tags, rather than data within the blocks, an amount of storage used is reduced for supporting the integrity tree. When the security processor detects events which create access requests for one or more blocks corresponding to the integrity tree, the security processor uses the integrity tree to verify a replay attack has not occurred and corrupted data. The data which is verified includes the requested blocks and the data in corresponding branches of the integrity tree.

These and other embodiments will be further appreciated upon reference to the following description and drawings.

Figure 1:
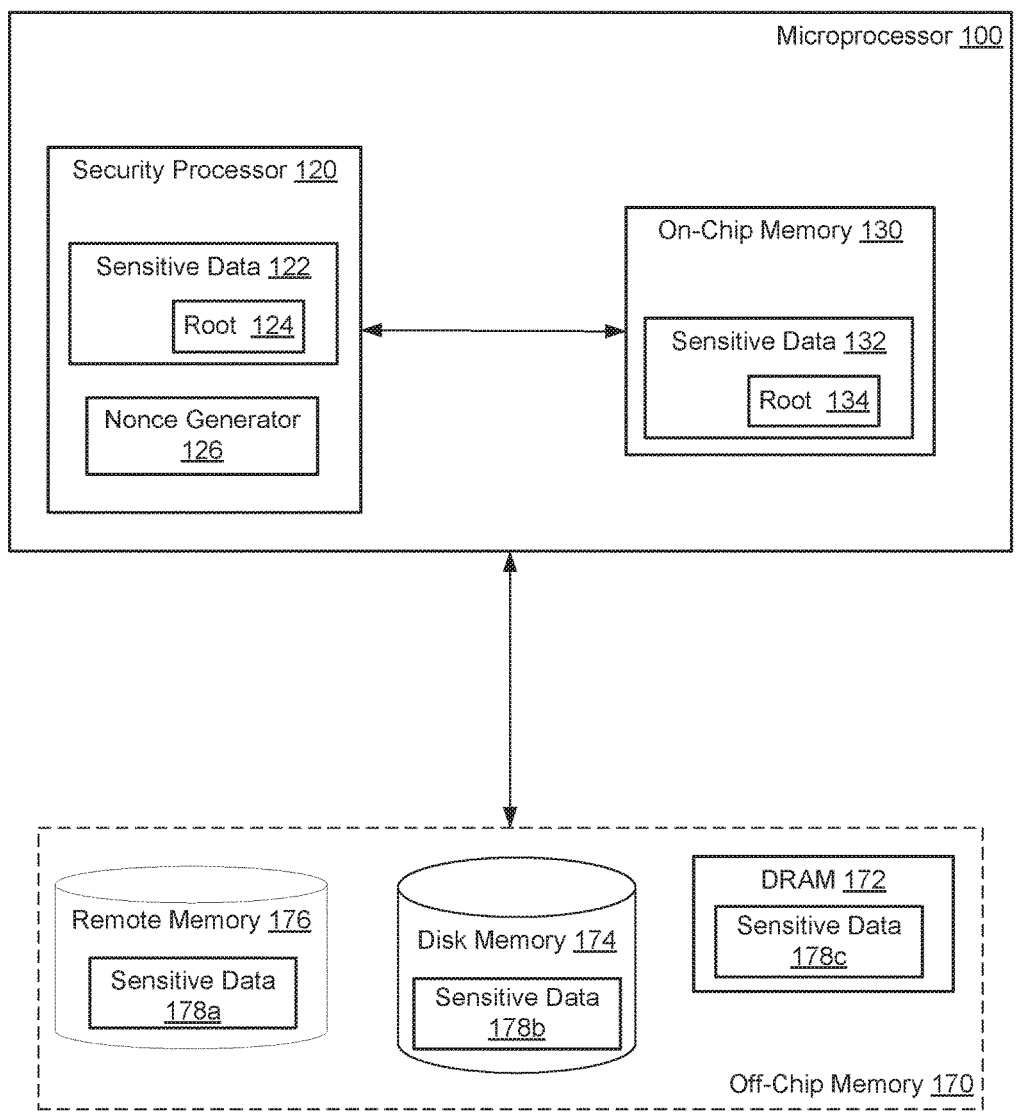
FIG. 1 is a generalized block diagram of one embodiment of protecting memory accesses.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

In various embodiments, a microprocessor includes a dedicated security processor for resisting and detecting attacks meant to compromise sensitive data. The security processor may support an integrity tree to detect sensitive data corrupted by replay attacks. Both the sensitive data to protect and corresponding error detection values may be stored in a particular arrangement determined by control logic in the security processor supporting the integrity tree. In various embodiments, the error detection values include nonces, which are arbitrary numbers with a chance of reuse below a given threshold. For example, a counter of an appreciable size may be used to generate the nonces. Accordingly, the nonces are generated independent of any values within the sensitive data.

The particular storage arrangement of the integrity tree may include a hierarchy of tree levels. The top of the integrity tree may include a single value that is referred to as a root. The security processor may determine the root based on nonces at the highest level of the integrity tree below the root. Accordingly, the root is also generated independent of any values within the sensitive data. As storage may be limited in an on-chip memory within the microprocessor, the information corresponding to the entire integrity tree may be partially stored in the on-chip memory and partially stored in off-chip memory.

In various embodiments, the root may be prevented from being stored outside the microprocessor. For example, the root may be further prevented from being stored outside the security processor or on-chip memory within the microprocessor. Therefore, the root may be protected from malicious modification performed on data stored in off-chip memory. When the security processor detects events which use access requests for the sensitive data, the security processor uses one or more of the root and one or more lower levels of the integrity tree to determine whether a replay attack has occurred and corrupted the sensitive data.

Referring to FIG. 1, a generalized block diagram of one embodiment of protecting memory accesses is shown. As shown, a microprocessor 100 includes a security processor 120 and on-chip memory 130. The microprocessor 100 is connected to off-chip memory 170. The off-chip memory 170 may include dynamic random access memory (DRAM) 172, disk memory 174 and remote memory 176. The microprocessor 100 may include other components, which are not shown at this time for ease of illustration. For example, at least another processor may be used in combination with the security processor 120, such as one or more of a central processing unit (CPU), a digital signal processor (DSP), a graphics processing unit (GPU), an application specific integrated circuit (ASIC), and so forth. In addition, the microprocessor 100 may include a power manager, a communication fabric, a memory controller, a network interface, one or more temperature sensors and current sensors, and one or more other sensors for interfacing with a button, a touch screen, a keyboard, a pointing device, a camera, and so forth. Any set of sensors may be employed. These other components are not shown for ease of illustration.

In various embodiments, the illustrated functionality of the microprocessor 100 is incorporated in a semiconductor die on a system on a chip (SOC). Accordingly, the security processor 120 and the on-chip memory 130 of the microprocessor 100 may be integrated onto a single semiconductor substrate. The microprocessor 100 may be included in a smartphone, a netbook, a desktop computer, a laptop computer and so forth. In another embodiment, the illustrated functionality is incorporated in a chipset on a computer motherboard. The microprocessor 100 may be included in a desktop or a server.

In various embodiments, the on-chip memory 130 is a static random access memory (SRAM). In other embodiments, another type of memory may be used. For example, on-die flash memory may be used for the on-chip memory 130. Although the off-chip memory 170 is shown as a single component, portions of the off-chip memory 170 may be distributed across a chipset, across a motherboard, in devices connected locally to a system, or in devices connected remotely across a network. For example, portions of the off-chip memory 170 may include dynamic random access memory (DRAM) 172. Other portions of the off-chip memory 170 may include disk memory 174, such as hard disk drives (HDDs) or solid-state disks (SSDs). Yet other portions of the off-chip memory 170 may include remote memory 176, such as DRAM or a disk drive (e.g., a HDD or a SSD) within a server used for Cloud-based storage.

The communication fabric in the microprocessor 100 may be any communication interconnect and protocol for communicating among the components of the microprocessor 100. The communication fabric may be bus-based, including shared bus configurations, cross bar configurations, and hierarchical buses with bridges. The communication fabric may also be packet-based, and may be hierarchical with bridges, cross bar, point-to-point, or other interconnects.

Although not shown, the microprocessor 100 may include a power manager for clock gating and selecting power-performance states (P-states) for the components in the microprocessor 100. The microprocessor 100 may include one or more power domains. Generally speaking, a power domain may receive a supply voltage (i.e. be powered on) or not receive a supply voltage (i.e. be powered off) independent of other power domains. In some embodiments, power domains may be supplied with different supply voltage magnitudes concurrently.

In an embodiment, portions of the microprocessor 100 may be powered down to reduce power consumption during use. However, one or more of the components in the microprocessor 100 may remain powered up when other components are powered down. These components remaining powered up may be "always-on" in the sense that they may be powered if the microprocessor 100 is receiving at least some power such as at times when the microprocessor 100 is in standby mode or is operating actively. The always-on components may not be powered when the microprocessor 100 is not receiving any power such as at times when a computing device including the microprocessor 100 is completely turned off. The on-chip memory 130 may be one of the always-on components.

In various embodiments, the microprocessor 100 is used for financial management and financial transactions, user communications other than voice (text, email, web browsing, etc.), streaming video, etc. Accordingly, the microprocessor 100 may operate on private user data (e.g., user fingerprint identifier, and user passwords) as well as data belonging to others (e.g., copyrighted audio, video and still images). Further, the microprocessor 100 may include secure boot loaders, baseband firmware for a baseband processor (e.g., a CPU), the kernel of an operating system (OS), software for the security processor 120, and so forth. Accordingly, the security processor 120 may be used to resist and detect attacks meant to compromise secure data.

The security processor 120 may be isolated from the rest of the microprocessor 100 except for a carefully-controlled interface (thus forming a secure enclave for the security processor 120). Because the interface to the security processor 120 is carefully controlled, direct access to the security processor 120 may be prevented. In one embodiment, a secure mailbox mechanism may be implemented. In the secure mailbox mechanism, external devices may transmit messages to an inbox. The security processor 120 may read and interpret the message, determining the actions to take in response to the message. Response messages from the security processor 120 may be transmitted through an outbox, which is also part of the secure mailbox mechanism. Other interfaces that permit only the passing of commands/requests from the external components and results to the external components may be used. No other access from the external devices to the security processor 120 may be permitted, and thus the security processor 120 may be "protected from access".

In various embodiments, a controller for the on-chip memory 130 may decode requests to access the sensitive data 132, and may prevent access to the sensitive data 132 unless the request is from the security processor 120. For example, a range of addresses in the on-chip memory 130 may be allocated to the security processor 120. If an address within the range is received, the controller may decode other attributes of the transaction to determine whether or not the request is sourced by the security processor 120. The attributes may include a source identifier (ID). The source ID may be part of a transaction ID. The source IDs may be assigned in hardware or may be configurable but not modifiable by software, and thus may be a secure mechanism for identifying the secure processor 120.

The security processor 120 may support encryption of data transferred between the microprocessor 100 and the off-chip memory 170. Encryption encodes a portion of all of the data transferred in such a way that authorized users are able to access it. The transferred data may be intercepted, but encryption techniques attempt to deny access to the content of the data by unauthorized users. A wide variety of cryptographic functions, such as hash functions, may be used to encrypt the transferred data.

The security processor 120 may include one or more processors cores, a secure boot read only memory (ROM), and control logic for providing security services. The security processor 120 is an example of a security circuit or a secure component. Generally speaking, a security circuit or a secure component may be any circuitry or control logic which performs one or more secure services.

Examples of secure services may include various cryptographic services such as authentication, encryption, decryption, etc. The result of authentication may be a pass/fail, for example. The result of encryption/decryption may be the encrypted/decrypted data. Secure services may also include secure key generation, where the keys may be used by components external to the security processor 120 for various security functions such as encryption or authentication. The result of secure key generation may be the key, or a wrapped key which has been encrypted using a key that has been supplied to the requestor in hardware that is not accessible to software.

Secure services may also include any services related to ensuring the protection of private data and/or preventing the unauthorized use of a system which includes the security processor 120. Protecting private or sensitive data may include preventing unauthorized access (e.g. theft of data) and/or preventing corruption/destruction of the data. Protecting private data may include ensuring the integrity and confidentiality of the data, and the availability of the data to authorized access.

Preventing unauthorized use of sensitive data may include ensuring that a permitted use is paid (e.g. network access by a portable device). Preventing unauthorized use of sensitive data may also include ensuring that malicious acts are prevented. Malicious acts may include, for example, use of a device to consume power from a battery of the device so that authorized use is curtailed due to a lack of power, acts to cause damage to the system or to another system that interacts with the system, use of the device to cause corruption of data/software, etc. Secure services may also include ensuring that the use of the system is available to authorized users as well, and authenticating authorized users.

The security processor 120 may execute securely-loaded software. For example, a secure read-only memory (ROM) within the security processor 120 may include software executable by the security processor 120. Control logic within the security processor 120 may include an interface connected to a source of software (e.g., a non-volatile memory such as Flash memory). The software may be encrypted to avoid observation by a third party. The software from the source may be authenticated or otherwise verified as secure, and afterward the software may be executable by the security processor 120. The control logic within the security processor 120 may include authentication circuitry and logic for implementing and accelerating various authentication algorithms.

In various embodiments, software may be loaded into a trusted or otherwise secure area located across the on-chip memory 130 and the off-chip memory 170. The security processor 120 may fetch the software from the trusted area for execution. For example, the trusted area may include one or more regions storing the sensitive data 132 in the on-chip memory 130 and the sensitive data 178a-178c in the off-chip memory 170. The access of the trusted area stored in the on-chip memory 130 and the off-chip memory 170 may also be controlled by privileges assigned to particular ranges of an address space.

Generally speaking, the on-chip memory 130 may have a higher security level than the security level of the off-chip memory 170. For example, the access of the content stored in the on-chip memory 130 or in registers in the security processor 120 is controlled by control logic on the microprocessor 100. The control logic for accessing this content may be within the security processor 120.

The access of content stored outside the protected regions may not be controlled by logic within the security processor 120 and the same privileges may not be used. Unlike accesses to the sensitive data 132, accesses to the off-chip memory 170 is not controlled exclusively by logic within the microprocessor 100. The reduced control over accesses to the off-chip memory 170 makes the off-chip memory 170 more vulnerable to attacks which may steal or corrupt the data stored in the off-chip memory 170.

When the microprocessor 100 receives the data from the off-chip memory 170, whether returned or initially accessed, additional steps may be used to provide security. The additional steps may include at least encryption, authentication and steps to detect replay attacks. These additional steps may not be used by the security processor 120 for accesses of data in the on-chip memory 130 or for accesses of data in registers in the security processor 120. These additional steps may not be used in these cases as the data in the on-chip memory 130 or in the registers within the security processor 120 have a higher security level than data stored in the off-chip memory 170. Gaining permission to the sensitive data 132 in the on-chip memory 130 and the registers in the security processor 120 may be highly selective. A controller for the on-chip memory 130 may permit only requests sourced by the security processor 120 to access the sensitive data 132 in order to maintain security of the sensitive data 132.

In order to detect replay attacks, the security processor 120 may support an integrity data structure to increase the security level of data accessed from the off-chip memory 170. In various embodiments, the integrity data structure is an integrity tree. Both the sensitive data to protect and corresponding error detection values may be stored in a particular arrangement determined by control logic in the security processor 120 supporting the integrity tree.

The sensitive data may be stored as data blocks in leaf nodes at the base of the integrity tree. The leaf nodes may be the lowest level of the integrity tree. In various embodiments, the error detection values include tags generated using a cryptographic message access code algorithms or other algorithm. Control logic within the security processor 120 may generate these tags and may use these tags for authentication tests.

In various embodiments, the error detection values stored in the integrity tree also include nonces. The nonces may be arbitrary numbers with a chance of reuse below a given threshold. For example, a counter of an appreciable size may be used to generate the nonces. For example, the nonce generator 126 in the security processor 120 may include a 64-bit counter although other sizes may be used. Accordingly, the nonce generator 126 generates the nonces independent of any values within the sensitive data. In some embodiments, the nonce generator 126 includes a counter that may only increment by a given amount. Therefore, the nonce generator 126 may increment by one or by another amount other than one. In other embodiments, the nonce generator 126 includes a counter that may only decrement by a given amount. In yet other embodiments, the nonce generator 126 reads or generates a timestamp value to provide a nonce. In yet further embodiments, the nonce generator generates the nonces using a pseudorandom number generator. These and other embodiments are possible and are contemplated.

The top of the integrity tree may include a single value that is referred to as a root. The security processor 120 may determine the root based on generated nonces at the highest level of the integrity tree below the root. Accordingly, the security processor 120 generates the root independent of any values within the sensitive data to protect.

In various embodiments, the root may be prevented from being stored outside the microprocessor 100. For example, the root 134 may be stored in the sensitive data 132 in the on-chip memory 130. A copy 124 of the root 134 may be stored in a register in the security processor 120. Therefore, the root 134 may be protected from malicious eavesdropping performed on data stored in the off-chip memory 170.

When the security processor 120 detects events which use access requests for the sensitive data, the security processor 120 uses one or more of the root 134 and lower levels of the integrity tree to determine whether a replay attack has occurred and corrupted the sensitive data. In addition to being used by the security processor 120 for detecting data corruption from replay attacks, the integrity tree consumes a reduced amount of storage as the root 134 and the nonces in the intermediate levels are generated independent of the values stored in the sensitive data to protect. A further description of the integrity tree follows.

Figure 2:
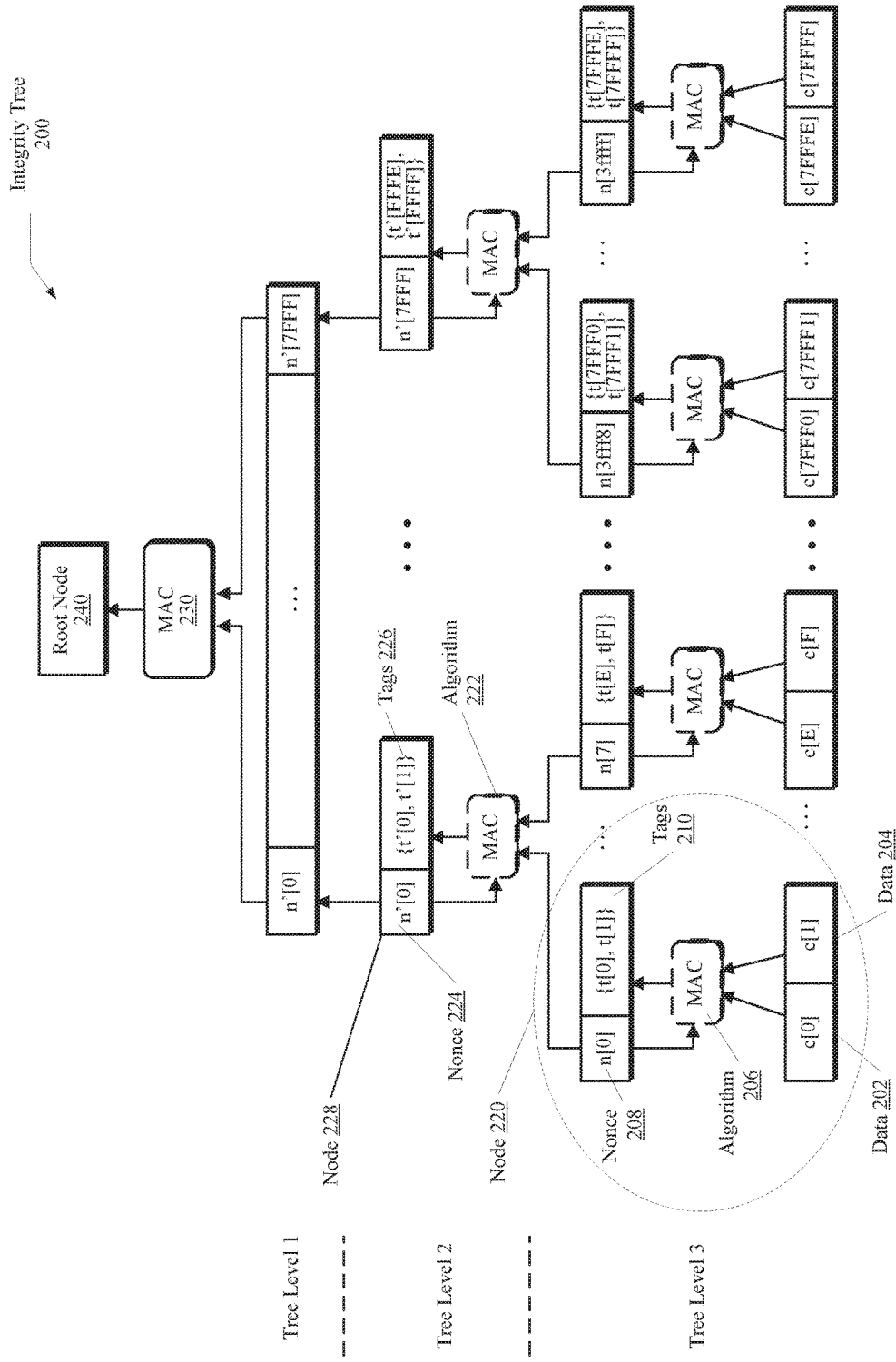
FIG. 2 is a generalized block diagram of one embodiment of an integrity tree.

Turning now to FIG. 2, a generalized block diagram of an integrity tree is shown. In the embodiment shown, the integrity tree 200 includes three tree levels—Tree Level 1 (TL1), Tree Level 2 (TL2) and Tree Level 3 (TL3). Although three levels are shown, the integrity tree may have a different number of tree levels in other embodiments. Each of the tree levels includes multiple nodes. Within the hierarchy of the integrity tree 200, the lowest level of the integrity tree includes the base of the integrity tree which are the leaf nodes depicted at the bottom of the figure. In the illustrated embodiment, the lowest level of the integrity tree 200 is labeled as Tree Level 3. The lowest level (TL3) includes multiple leaf nodes, such as leaf node 220. As shown, node 220 includes a nonce 208, tags 210, and data 202 and 204. Moving up from the lowest level TL3 is level TL2. The tree level TL2 includes multiple nodes such as node 228. Values within node 228, such as the tags 226, are dependent on one or more values stored in nodes below it, such as at least node 220. The top of the integrity tree is a single value, which is referred to as the root, such as root 240.

The integrity tree 200 may be used to verify data transferred between a microprocessor and off-chip memory. The integrity tree makes sure that data blocks received from the off-chip memory are received undamaged and unaltered. At the lowest tree level (TL3), each leaf node stores sensitive content corresponding to portions of files, entire files or a set of files. In some embodiments, the sensitive data content in each leaf node is a 64-byte memory block. In other embodiments, a memory block is 128 bytes and the memory block is divided into two 64-byte sub-blocks. Other sizes for the memory blocks within leaf nodes are possible and contemplated.

As shown, data 202 includes sensitive data stored in a location designated c[0]. In various embodiments, the nomenclature c[n] may simply indicate the nth data block c and may not indicate any particular storage location. In other embodiments, c[n] may provide some indication as to a storage arrangement or location. For example, c[n] may correspond to a storage location with an address lower than c[n+1]. In some embodiments, n may represent a type of index that can be used to determine an offset from a known base address. A variety of such embodiments are possible and are contemplated. Similarly, data 204 includes sensitive data stored in location designated c[1]. Other leaf nodes which are not labeled include sensitive data corresponding to the locations c[2] to c[7FFFF] where the designations use hexadecimal format. In various embodiments, the sensitive content of the leaf nodes is encrypted.

As shown, the tags 210 in node 220 are based (at least in part) upon the data 202 and 204. The algorithm 206 receives the data 202 and generates the output tag t[0] of tags 210. The algorithm 206 also receives the data 204 and generates the output tag t[1] of tags 210. The tags 210 may include a concatenation of the tags t[0] and t[1].

In various embodiments, the algorithm 206 is an algorithm used to generate the tags 210. The algorithm 206 may also receive a key (not shown) to generate the tags 210. In other embodiments, the algorithm 206 is one of a variety of hash functions used to generate the tags. For example, the hash function SHA-2 may be used.

The algorithm 206 may receive additional inputs to generate the tags. For example, the algorithm 206 may receive the address of the data 202 in addition to the sensitive content data 202 to generate the tag t[0] of tags 210. Similarly, the algorithm 206 may receive the address of the data 204 in addition to the sensitive content data 204 to generate the tag t[1] of tags 210. The algorithm 206 may also receive the nonce 208 (n[0]). As described earlier, a counter of an appreciable size may be used to generate the nonce 208. Alternatively, the nonce 208 may be a timestamp value. The nonce 208 may be used to provide a time reference when the data 202 and 204 are created and modified.

As described earlier, the integrity tree 200 includes multiple other nodes in the tree level 3 (TL3) in addition to the node 220. Similar to the node 220 being dependent upon the data 202 and 204, each of the other nodes is dependent upon a respective pair of data blocks. Again, although each node is dependent upon two respective data blocks, in other embodiments, another number of data blocks may be used. Additionally, a respective nonce is generated for each of the nodes. As shown in the illustrated embodiment, the tree level 3 includes the nonces n[0] to n[3FFFF]. These nonces are used to generate respective tags such as tags t[0] to t[7FFFF].

Moving up the hierarchy of the integrity tree 200 to tree level 2 (TL2), the algorithm 222 receives multiple nonces from the previous tree level (TL3) as inputs. In some embodiments, the algorithm 222 is a same algorithm as the previous algorithm 206. In other embodiments, the algorithm 222 is a different MAC algorithm, hash function or other. In some embodiments, the algorithm 222 uses a different key than a key used by algorithm 206.

It is noted that the algorithm 222 does not receive the tags from the previous tree level (TL3). Rather, as shown in the illustrated embodiment, the algorithm 222 receives eight nonces (n[0] to n[7]) from the previous tree level (TL3), but no tags. Accordingly, the tags generated by the algorithm 222 are independent of any value in the tags in TL3 and independent of any value in the data blocks in TL3.

Although each algorithm in the tree level 2 (TL2) receives eight nonces from the previous tree level (TL3), in other embodiments, another number of nonces may be used. The algorithm 222 may also receive the nonce 224 (n'[0]) generated at TL2 rather than generated at TL3. The nonce 224 may be generated in a similar manner as other nonces. In various embodiments, the algorithm 222 uses a key, nonces n[0] to n[3], and nonce n'[0] to generate the tag t'[0] of tags 226. In other embodiments, the algorithm 222 uses the key, each odd indexed nonce of the nonces n[0] to n[7], and nonce n'[0] to generate the tag t'[0] of tags 226. In yet other embodiments, the algorithm 222 uses each even indexed nonce or other selected grouping of the nonces n[0] to n[7] in addition to the key and the nonce n'[0] to generate the tag t'[0] of tags 226. These and other embodiments are possible and are contemplated. Although each algorithm in the tree level 2 (TL2) is shown to receive four nonces from the previous tree level (TL3) to generate a given tag, in other embodiments a different number of nonces may be used. The algorithm 222 may use a key, nonces n[4] to n[7] (or another selected grouping from nonces n[0] to n[7]), and nonce n'[0] to generate the tag t'[1] of tags 226. In various embodiments, the nonce 224 (n'[0]) concatenated with the tags 226 is used to produce data for node 228 in TL2. In some embodiments, the node 228 in TL2 additionally includes a copy of one or more nonces n[0] to n[7] from TL3.

As shown, the integrity tree 200 includes multiple other nodes in the tree level 2 (TL2) in addition to the node 228. Similar to the node 228 being dependent upon nonces in nodes below it, each of the other nodes in TL2 is dependent upon respective nonces from TL3, but is independent of tags and data blocks in TL3. Additionally, a respective nonce is generated for each of the nodes in TL2. As shown in the illustrated embodiment, the tree level 2 (TL2) includes the nonces n'[0] to n'[7FFF]. These nonces are used to generate respective tags such as tags t'[0] to t'[FFFF]. In some embodiments, each of the nodes in TL2 includes a copy of one or more nonces from nodes in a lower level (e.g., TL3). As described earlier, the node 228 in TL2 may additionally include a copy of one or more nonces n[0] to n[7] from TL3. Similarly, a node at the far right of TL2 may include a copy of one or more nonces n[3FFF8] to n[3FFFF] from TL3.

Moving up the hierarchy of the integrity tree 200 to tree level 1 (TL1), a copy of the nonces n'[0] to n'[7FFF] in TL2 is provided in TL1. In the illustrated embodiment, tree level 1 (TL1) includes the nonces n'[0] to n'[7FFF] from TL2. In various embodiments, the data in TL1 is stored in on-chip memory, such as the earlier on-chip memory 130 in microprocessor 100. The dashed line between TL1 and TL2 illustrates a boundary between the tree levels. The data in TL2 and TL3 may be stored in off-chip memory, such as the earlier off-chip memory 170 connected to the microprocessor 100. In addition, a copy of the root 240 may be stored in a register in the security processor. By using a dependence on nonces alone in upper tree levels, such as TL2 and TL1, rather than dependencies on tags and data blocks from TL3, the amount of storage used to support the integrity tree 200 may be reduced.

In some embodiments, a root value is not maintained during accesses of data in the integrity tree 200. In other embodiments, a root value is maintained and the top of the integrity tree 200 is the root 240. The root 240 is the tag generated by the algorithm 230. In some embodiments, the algorithm 230 in TL1 receives both a key and one or more values for the nonces n'[0] to n'[7FFF] maintained in TL1 in order to generate the root 240. In some embodiments, the integrity tree 200 additionally stores values in TL1 that are copies of one or more nonces n[0] to n[3FFFF] from TL3. In other embodiments, the integrity tree 200 stores in TL1 one or more values that are copies of one or more nonces n[0] to n[3FFFF] from TL3 in place of values that are copies of one or more nonces n'[0] to n'[7FFF] from TL2. In yet other embodiments, the integrity tree 200 stores only the root 240 in TL1 and does not maintain a copy of any nonces in the on-chip memory. In such embodiments, the algorithm 230 in TL1 receives the key, an updated value of a given nonce (e.g., n'[0] for updating data c[1]) of the nonces n'[0] to n'[7FFF] generated at the time of a write operation (e.g., updating data c[1]), and the stored values in off-chip memory of the other nonces (e.g., nonces n'[1] to n'[7FFF]) in order to generate the root 240.

In various embodiments, TL1 of the integrity tree 200 includes a data array which contains values that are copies of one or more new nonces n'[0] to n'[7FFF] used in TL2. In addition, in some embodiments, TL1 may include one or more values that are copies of one or more nonces n[0] to n[3FFFF] used in TL3. No new nonce is generated in TL1. In some embodiments, the algorithm 230 in TL1 is a same algorithm as one or more previous algorithms used in the integrity tree 200. In other embodiments, the algorithm 230 is a different MAC algorithm, hash function or other. In some embodiments, the algorithm 230 uses a different key than a key used by one or more of the previous algorithms.

When the security processor has an access request for data corresponding to one of the data blocks in TL3, such as c[1] from off-chip memory, the security processor reads from off-chip memory the nonces n[0]-n[3] in TL3. The nonces n[0]-n[3] were used earlier to generate the tag t'[0] in TL2. The security processor also reads the nonce n'[0] in TL2 from off-chip memory. The nonce n'[0] was also used earlier to generate the tag t'[0] in TL2. In some embodiments, the security processor additionally reads one or more of the nonces n[0]-n[7] in TL2 if copies of the one or more of the nonces n[0]-n[7] were stored earlier in TL2. Further, the security processor reads from off-chip memory the tags t[1] and t'[0] in TL2.

In various embodiments, the security processor decrypts the received c[1] and uses the algorithms 206 and 222 and corresponding keys and nonces to generate tag values t[1] and t'[0], respectively. The generated tag values are compared to the received tag values t[1] and t'[0] from off-chip memory. Generally speaking, when the security processor compares two values, the security processor determines whether the two values are the same or identical. When two values are determined to be identical, the two values may be considered to be a match. For example, if the value of the generated tag value t[1] is determined to be the same (identical) to the value t[1] received from off-chip memory, then the two tag values may be considered to be a match.

In some embodiments, the security processor also compares one or more values for nonces n[0]-n[7] in TL3 retrieved from off-chip memory to one or more values for nonces n[0]-n[7] in TL2 also retrieved from off-chip memory. The one or more values for nonces n[0]-n[7] in TL3 should be copies of the values for nonces n[0]-n[7] in TL2. If the security processor finds matches for each of the above comparisons, then the received data may be deemed to have passed the node level integrity checks. Otherwise, the security processor generates an error indication (e.g., a flag or some other indication) that may be used for error handling.

If the above node level integrity checks pass, then a further integrity check may occur at TL1. For example, if a copy of the nonces n'[0] to n'[7FFF] was stored earlier in on-chip memory, then the root may not be generated and verified. Rather, the value of the nonce n'[0] stored in on-chip memory and corresponding to the data c[1] being accessed may be compared to the value of the nonce n'[0] retrieved from off-chip memory. A mismatch may indicate data corruption. A match may indicate the received data c[1] passed data authentication. However, if the above received data for c[1] passes the node level integrity checks and the nonces n'[0] to n'[7FFF] are stored in off-chip memory only and not in the on-chip memory, then using the algorithm 230, the security processor combines the nonce n'[0] retrieved from the off-chip memory with the other nonces n'[1] to n'[7FFF] retrieved from the off-chip memory. The generated root may then be compared to the stored root 240. If the security processor finds a match, then the received data passed data authentication and an access request for the data c[1] may complete. Otherwise, the data is corrupted from a replay attack and the security processor generates a flag for error handling. It is noted that in embodiments where TL1 is stored on-chip, generation and comparison for a root value may not be needed or performed for each access.

In some embodiments, each of the values in the integrity tree 200 is encrypted. In other embodiments, the data blocks in TL3 are the only values encrypted. In yet other embodiments, particular values in a given tree level or an entire particular tree level is encrypted. In one example, each of the data blocks is 64 bytes, each of the tags is 16 bytes and each of the nonces is 8 bytes. The tree level 1 (TL1) is stored in on-chip memory, which may be a 256 kilobyte SRAM. In various embodiments, the on-chip memory does not lose contents during power gating states of the chip. In this example, the integrity tree 200 may protect 16 megabytes of software-visible data.

The error detection values associated with the data blocks may be included in one or more nodes within one or more intermediate levels of the integrity tree. The intermediate levels are located higher in the integrity tree hierarchy than the leaf nodes at the lowest level. The top of the integrity tree may include a single value that is referred to as a root. The computation for determining the root may be based on error detection values at the highest level of the integrity tree below the root. These error detection values may be generated independent of any value within the blocks at the lowest level of the integrity tree. Accordingly, the root may be independent of any value within the data blocks in the leaf nodes of the integrity tree. Rather than being based on values within the blocks, these error detection values and the root may be based on values which are arbitrary numbers that may only be used once. These values may be referred to as nonces.

In some embodiments, the nonces may have a chance of reuse which is below a given threshold. For example, a counter of an appreciable size may be used to generate the nonces. In some embodiments, a 64-bit counter is used to provide arbitrary integers with a chance of reuse which is below a given threshold. In various embodiments, the nonces may be used to provide an indication of a time reference when blocks are created and modified. For example, the nonces may be timestamp values. In some embodiments, the security processor 120 includes a nonce generator 122 which provides nonces for the integrity tree. By using nonces, rather than tags derived from values stored within the blocks, the amount of storage used to store the error detection values in the integrity tree may be reduced.

In various embodiments, the root of the integrity tree may be stored in the on-chip memory 130. In other embodiments, the nonces at the highest tree level below the root are additionally stored in the on-chip memory along with the root. In yet other embodiments, one or more nonces from other tree levels are additionally stored in the on-chip memory. In some embodiments, the root is not updated in the on-chip memory as frequently as the one or more nonces stored in the on-chip memory. Therefore, the secure error detection data in the on-chip memory includes one or more nonces maintained in the on-chip memory and the root, which may be updated less frequently than the one or more nonces. As shown, the root 134 may be stored within the sensitive data 132 in the on-chip memory 130. The sensitive data 132 may include the secure error detection data, such as the one or more nonces maintained in the on-chip memory and the root, which may be updated less frequently than the one or more nonces. A copy of the root shown as root 124 may be stored in a register within the security processor 120. Additionally, one or more of the nonces of the sensitive data 132 may be stored within the security processor 120. Further, the sensitive data 132 may be prevented from being stored outside the microprocessor 100. The sensitive data 132 may be further prevented from being stored outside the on-chip memory 130 and the security processor 120.

As described above, one or more levels of the integrity tree may also be stored in the on-chip memory 130 within the sensitive data 132. As storage may be limited in the on-chip memory 130, the information corresponding to the entire integrity tree is not stored in the on-chip memory 130. Rather, the off-chip memory 170 may store the remainder of the information corresponding to the integrity tree. For example, the remainder of the information corresponding to the integrity tree may be stored in one or more of the sensitive data 178*a*-178*c* in the off-chip memory 170.

Figure 3:
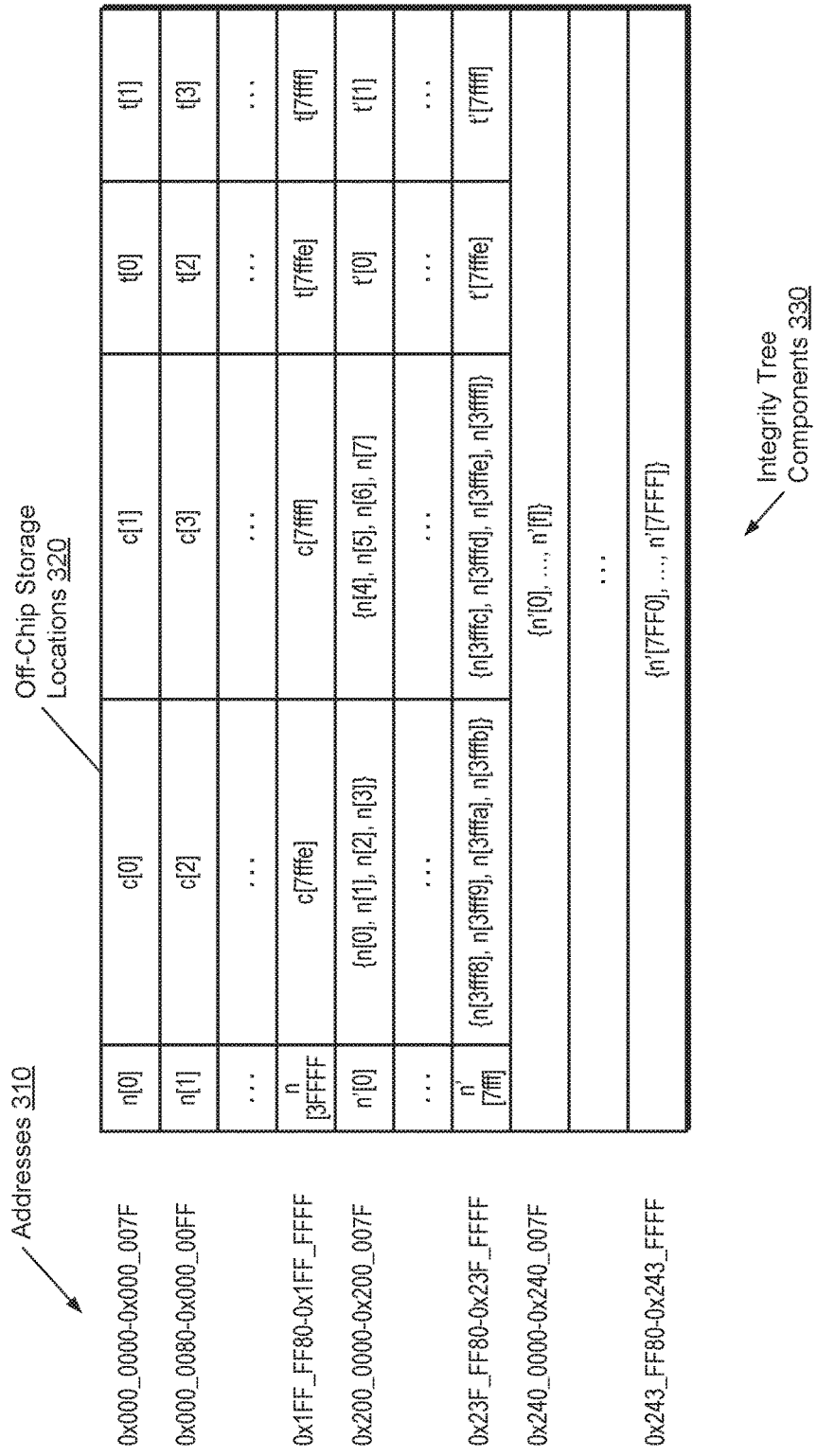
FIG. 3 is a generalized block diagram of one embodiment of a storage arrangement of an integrity tree.

Referring now to FIG. 3, a generalized block diagram of one embodiment of a storage arrangement of the data corresponding to an integrity tree. The storage arrangement includes the off-chip storage locations 320 and the corresponding addresses 310. The data stored in the off-chip storage locations 320 include integrity tree components 330, such as nonces and tags used in the integrity tree. For example, the data blocks c[0] and c[1] may be (though not necessarily) stored at lower addresses of the integrity tree address space. The associated nonce n[0] and tags t[0] and t[1] may be stored nearby as shown. In various embodiments, data corresponding to a same node are stored together. In other embodiments, data corresponding to the same node are stored separately. In some embodiments, each of the nodes in TL2 includes values that are copies of one or more nonces from respective nodes in TL3. For example, as described earlier, the node 228 in TL2 may additionally include values that are copies of one or more nonces n[0] to n[7] in TL3. As shown, the node 228 (of FIG. 2) has content stored in the address range 0x200_0000-0x200_007F in the off-chip storage locations 320. The node 228 includes a value that is a copy of the nonce n[0]. A value for the nonce n[0] is also stored in the address range 0x000_0000-0x000_007F in the off-chip storage locations 320. During data authentication, these separate values for the nonce n[0] may be compared.

For ease of discussion, the addresses 310 are shown beginning with address 0. However, in various embodiments the starting address may be any other suitable address or location. The base address and the size of the integrity tree may be configurable during initialization. In addition, a boundary for alignment may be chosen. For example, the base address may be aligned to a 1 kilobyte boundary although other boundary values may be chosen. The base address of the integrity tree may point to any location within a protected region or a trusted area stored in one or more of on-chip memory and off-chip memory. In some embodiments, the storage locations 320 storing the integrity tree components 330 may be consecutive and contiguous storage locations. In other embodiments, the storage locations 320 storing the integrity tree components 330 may be located in different portions of a trusted area stored in one or more of on-chip memory and off-chip memory. In other embodiments, such a trusted area is not needed or included.

In various embodiments, an amount of storage space for storing the integrity tree components 330 is limited in the on-chip memory. For example, the on-chip memory may be allocated 256 kilobytes for storing one or more of the integrity tree components 330 although other storage limits may be used. Accordingly, in some embodiments, the on-chip memory may store only the root of the integrity tree. In other embodiments, the on-chip memory may store the root and a copy of the nonces at the highest level of the integrity tree below the root. In yet other embodiments, the on-chip memory may store these values in addition to a copy of one or more additional integrity tree components 330 corresponding to nonces and tags throughout the tree levels such as TL2.

Figure 4:
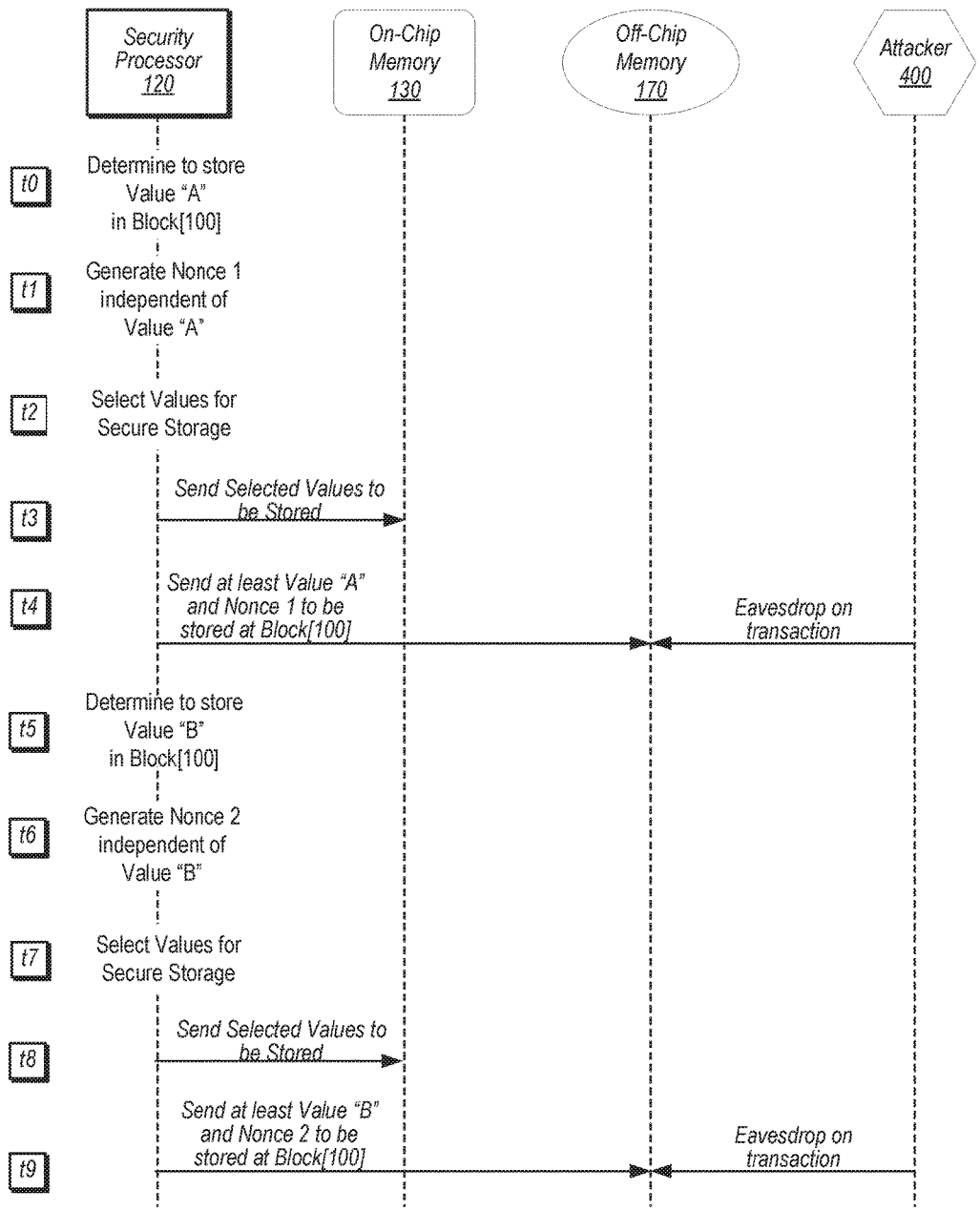
FIG. 4 is a generalized diagram of one embodiment of a sequence diagram used for handling read and write requests in a multi-node computing system.

Referring now to FIG. 4, a generalized block diagram illustrating an embodiment of a sequence diagram used for updating values in a trusted area and the corresponding eavesdropping is shown. Circuitry and logic previously described is numbered identically. As shown, a sequence of steps are used when the security processor 120 updates sensitive information. In various embodiments, the circuitry and logic described earlier for the microprocessor 100 and the integrity tree 200 may be used. At time t0, the security processor 120 detects an event which causes the security processor 120 to write the value "A" in Block[100] of a trusted area. For example, the security processor 120 may have detected an event to update secure data such as financial management data, user communication data, received sensitive data from other people or organizations, secure boot process data and so forth.

The Block[100] may be representative of one of the blocks c[0] to c[7FFFF] shown earlier in the integrity tree 200. Here, the address 100 is selected for ease of illustration and does not limit the trusted area to any particular address space. The generic value "A" may correspond to any data size. The generic value "A" may represent any data value and does not necessarily indicate the hexadecimal value A.

At time t1, the nonce generator in the security processor 120 generates Nonce 1. For example, the Nonce 1 may be a constantly incrementing (or constantly decrementing) integer independent of Value "A." In various embodiments, the security processor 120 generates multiple nonces. For example, referring again to the integrity tree 200, if the Block[100] corresponds to c[F], then the security processor 120 may generate updated values for the nonce n[7], the tag t[F], the nonce n'[0] and the tag t'[1].

At time t2, in some embodiments, the security processor 120 generates Root 1 based on nonces in the level below the root. Referring again to the embodiment using the integrity tree 200, the security processor 120 updates the Root 1 based on the updated nonce n'[0] and the current values for the nonces n'[1] to n'[7FFF]. In other embodiments, the Root 1 is not generated as the nonces at the highest integrity tree level below the Root 1, such as nonces n'[0] to n'[7FFF], will be later stored in the secure on-chip memory 130 and used for data authentication. In some embodiments, verification steps, such as the upcoming steps described in t11-t16 of FIG. 5 and the upcoming description of method 700 in FIG. 7, may be used prior to actually writing data blocks in a leaf node. In other embodiments, the verification steps are used for read accesses of data blocks in leaf nodes rather than used for both read accesses and write accesses. At time t2, one or more values may be selected for secure storage in the on-chip memory 130. In some embodiments, the Root 1 is only selected. In other embodiments, the Root 1 and the current values of the nonces at the highest tree level below the Root 1 are selected. For example, the nonces n'[0] to n'[7FFF] may be selected in addition to the Root 1. In yet other embodiments, only the current values of the nonces at the highest tree level with nonces are selected. For example, the nonces n'[1] to n'[7FFF] may be the only selected values. In further embodiments, nonces from one or more further lower tree levels may be additionally selected. At time t3, the security processor 120 sends the selected values to be stored in the on-chip memory 130.

At time t4, the security processor 120 sends Value "A" to be stored at Block[100] in the off-chip memory 170. The security processor 120 may also send at least Nonce 1 to be stored in the off-chip memory 170. Using the earlier example, the security processor 120 may send the updated values for the nonce n[7], the tag t[F], the nonce n'[0] and the tag t'[1] to the off-chip memory 170.

As shown, an attacker 400 may eavesdrop on the transaction to the off-chip memory 170. A malicious person, application or firmware implant may eavesdrop on transactions between the microprocessor 100 and the off-chip memory 170. In addition, the results of the transactions stored in the off-chip memory 170 may be analyzed by malicious attackers. Although the eavesdropping is shown at the same time t4, the malicious access of the data stored in the off-chip memory 170 may occur at a later time, but earlier than a subsequent update of the sensitive data stored in the Block[100].

Malicious attacks come in a variety of forms. Unauthorized physical access, malicious hardware devices, low-level software attacks, malicious firmware implants on devices or routers used for network connectivity, and unauthorized access of remote memory, such as DRAM or other memory devices in servers used for Cloud-based storage, are some examples. Losing control over external devices, such as the off-chip memory 170, makes data on external devices far more vulnerable than the data stored in the on-chip memory 130.

The malicious attacker 400 may also be aware that encryption and authentication steps are used to protect the data in the transactions. Therefore, the malicious attacker 400 may access other storage locations other than the Block[100] in order to read corresponding nonces and tags corresponding to the sensitive data Value "A." Further, the malicious attacker 400 may learn or already be aware of the storage arrangement of data in an address space.

Unbeknownst to the malicious attacker 400, the security processor 120 updated the root to the value Root 1. The value Root 1 has been stored in the on-chip memory 130. In addition, a copy of the value Root 1 may also be stored in a register within the security processor 120. The value Root 1 may be prevented from being stored outside of the on-chip memory 130 and the security processor 120.

At time t5, the security processor 120 detects an event which writes the Value "B" in Block[100] of the trusted area. At time t6, the nonce generator in the security processor 120 generates Nonce 2 independent of the Value "B." Referring again to the integrity tree 200, if the Block[100] corresponds to c[F], then the security processor 120 may generate updated values for the nonce n[7], the tag t[F], the nonce n'[0] and the tag t'[1].

At time t7, in some embodiments, the security processor 120 generates Root 2 based on at least Nonce 2. Referring again to the embodiment using the integrity tree 200, the security processor 120 updates the Root 2 based on the updated nonce n'[0] and the current values for the nonces n'[1] to n'[7FFF]. However, as noted above, in other embodiments the Root 2 is not generated as the nonces at the highest integrity tree level below the Root 2 are stored in on-chip memory 130 and used for later data authentication. In some embodiments, verification steps, such as the upcoming steps described in t11-t16 of FIG. 5 and the upcoming description of method 700 in FIG. 7, may be used prior to actually writing data blocks in a leaf node. For example, a read-modify-write operation may occur for updates and the verification steps occur during the read part of the read-modify-write operation. In other embodiments, the verification steps are used only for read accesses of data blocks in leaf nodes rather than additionally used for write accesses of data blocks in leaf nodes even for read-modify-write operations. At time t7, one or more values may be selected for secure storage in the on-chip memory 130. Examples of the selected values are similar to the examples described for the selected values at the earlier time t2. At time t8, the security processor 120 sends the selected values to be stored in the on-chip memory 130.

At time t9, the security processor 120 sends Value "B" to be stored at Block[100] in the off-chip memory 170. The security processor 120 may also send at least Nonce 2 to be stored in the off-chip memory 170. Using the earlier example, the security processor 120 may send the updated values for the nonce n[7], the tag t[F], the nonce n'[0] and the tag t'[1] to the off-chip memory 170. As shown, an attacker 400 may eavesdrop on the transaction to the off-chip memory 170. Although the eavesdropping is shown at the same time t9, the malicious access of the data stored in the off-chip memory 170 may occur at a later time, but earlier than a subsequent update of the sensitive data stored in the Block[100].

Figure 5:
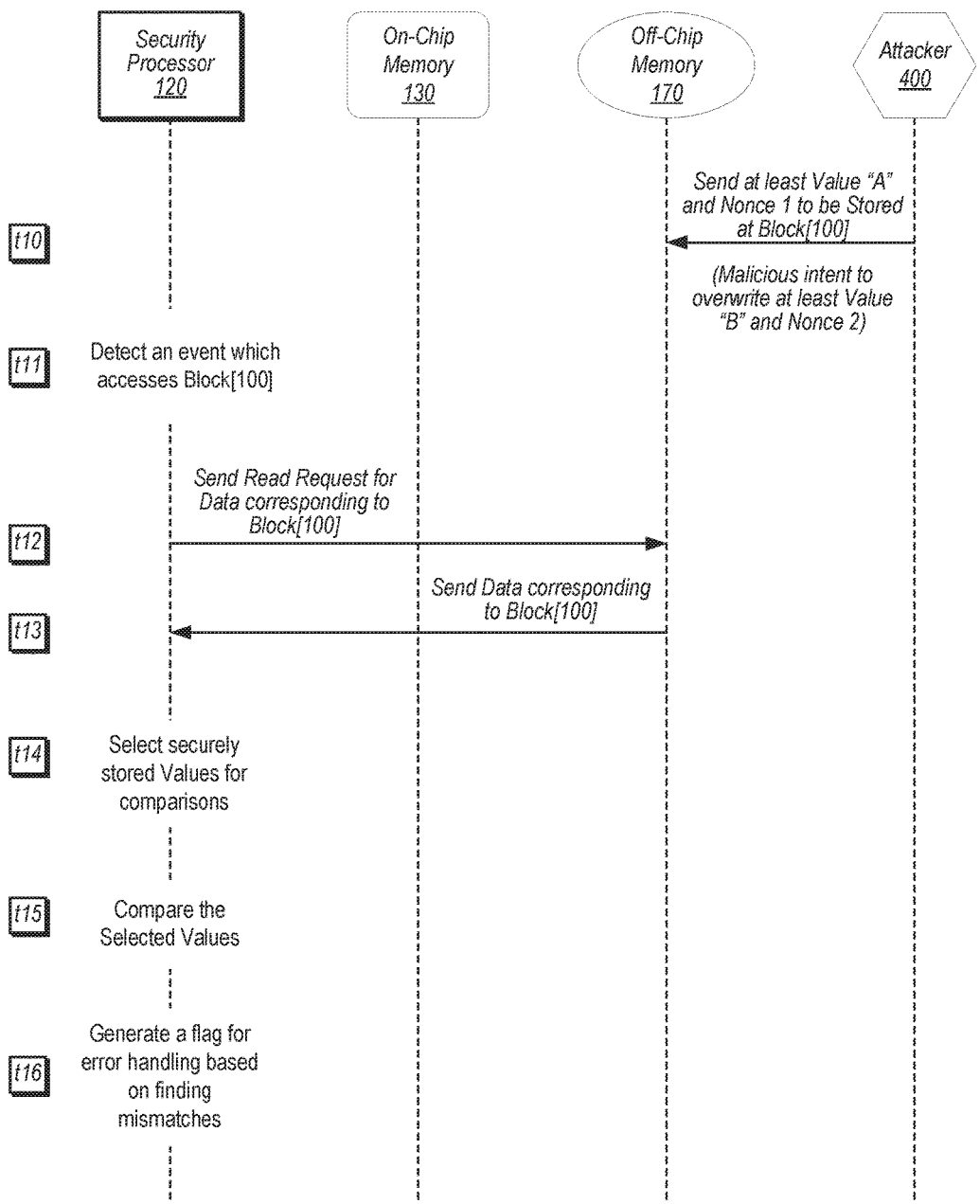
FIG. 5 is a generalized diagram of one embodiment of a sequence diagram used for detecting a replay attack.

Referring now to FIG. 5, a generalized block diagram illustrating an embodiment of a sequence diagram used for detecting a replay attack is shown. Circuitry and logic previously described is numbered identically. As shown, a sequence of steps are used when the security processor 120 accesses sensitive information. In various embodiments, the circuitry and logic described earlier for the microprocessor 100 and the integrity tree 200 may be used. At time t10, the malicious attacker 400 sends at least the Value "A" and Nonce 1 to the off-chip memory 170 to be stored in Block[100] of a trusted area. The malicious attacker 400 may have the intent to overwrite at least the previously written Value "B" and Nonce 2 in the off-chip memory 170.

The malicious attacker 400 may become aware of the previous update from the value "A" to the value "B", but the malicious attacker 400 wishes the updated content to return to a previous value. For example, the malicious attacker 400 may want an older password to remain valid, may want a bank account sum to return to a larger value, may want an order amount to return to a previous value, and so forth.

By sending the Value "A" and the Nonce 1, which are both previously written values, the malicious attacker 400 may "replay" an earlier write transaction to the sensitive data 178a-178c in the off-chip memory 170. The malicious attacker 400 may also send earlier corresponding error detection values stored at nearby addresses, such as nonces and MAC tags. Therefore, the content stored in the sensitive data 178a-178c in the off-chip memory 170 and modified by the replayed write transaction may pass encryption and authentication steps when later read by the security processor 120.

At time t11, the security processor 120 may detect a legitimate event which accesses data stored in Block[100]. At time t12, the security processor 120 sends a read request to the off-chip memory 170 for the sensitive data stored in Block[100]. For example, referring again to the integrity tree 200, if the Block[100] corresponds to c[F], then the security processor 120 may generate read requests for the block c[F], the nonce n[7], the tag t[F], the nonce n'[0] and the tag t'[1].

At time t13, the off-chip memory 170 sends the requested data to the security processor 120. Using the earlier example, the security processor 120 receives the previous values for the block c[F], the nonce n[7], the tag t[F], the nonce n'[0] and the tag t'[1]. For example, the security processor 120 receives the Value "A" for c[F], rather than Value "B." Additionally, the security processor 120 receives the value Nonce 1 for n'[0], rather than Nonce 2.

The security processor 120 may generate MAC tags, such as a generated value for the tag t[F] from the received c[F] (Value "A") and the tag t'[1] from the received nonce n[7]. The security processor 120 may compare the generated tags t[F] and t'[1] to the received tags t[F] and t'[1] from the off-chip memory 170 and determine the values match. Therefore, despite the malicious overwrite, the authentication tests, such as the node level integrity checks, pass.

At time t14, the security processor 120 selects which securely stored values to use for comparisons. In embodiments in which TL1 is not stored on-chip, the security processor 120 generates the root value Root 1 based on the current values for the nonces n'[1] to n'[7FFF] and the received nonce n'[0] (Nonce 1, rather than Nonce 2). As described earlier, one or more values were selected for secure storage in the on-chip memory 130. Examples of the selected values are similar to the examples described for the selected values at the earlier time t2 (of FIG. 4). In one example, the nonce corresponding to Value "B" in Block [100] and within the highest tree level below the root, such as nonces n'[0] to n'[7FFF], may be selected for comparison. In other examples, the Root 1 or another value stored in the on-chip memory 130 may be selected for comparison.

At time t15, the security processor 120 performs one or more integrity checks at one or more levels of the integrity tree. For example, the security processor 120 may generate tags based on data received from the off-chip memory 170 and compare the generated tags to the tags received from the off-chip memory 170. In addition, values that should be copies of the same nonces stored at different tree levels may be compared. Mismatches indicate data corruption. Matches indicate passed integrity checks. After successful integrity checks, the security processor 120 compares the selected value stored in the on-chip memory 130 with the corresponding value received from the off-chip memory 170. For example, the value stored in the on-chip memory 130 that should be a copy of the nonce n'[0] may be compared to the received value from the off-chip memory 170 of the nonce n'[0]. In other embodiments, the root is selected for comparison. In these embodiments, the value Root 2 is retrieved either from a register in the security processor 120 or from the on-chip memory 130 for comparing to a root value generated from values received from the off-chip memory 170.

At time t16, the security processor 120 generates a flag for error handling based on determining a mismatch during the comparison. Therefore, the security processor 120 detects corrupt data from a replay attack although the authentication tests pass. In addition, the integrity tree consumes less storage space as the root and one or more tags are based solely on nonces rather than values within the sensitive data to protect.

Figure 6:
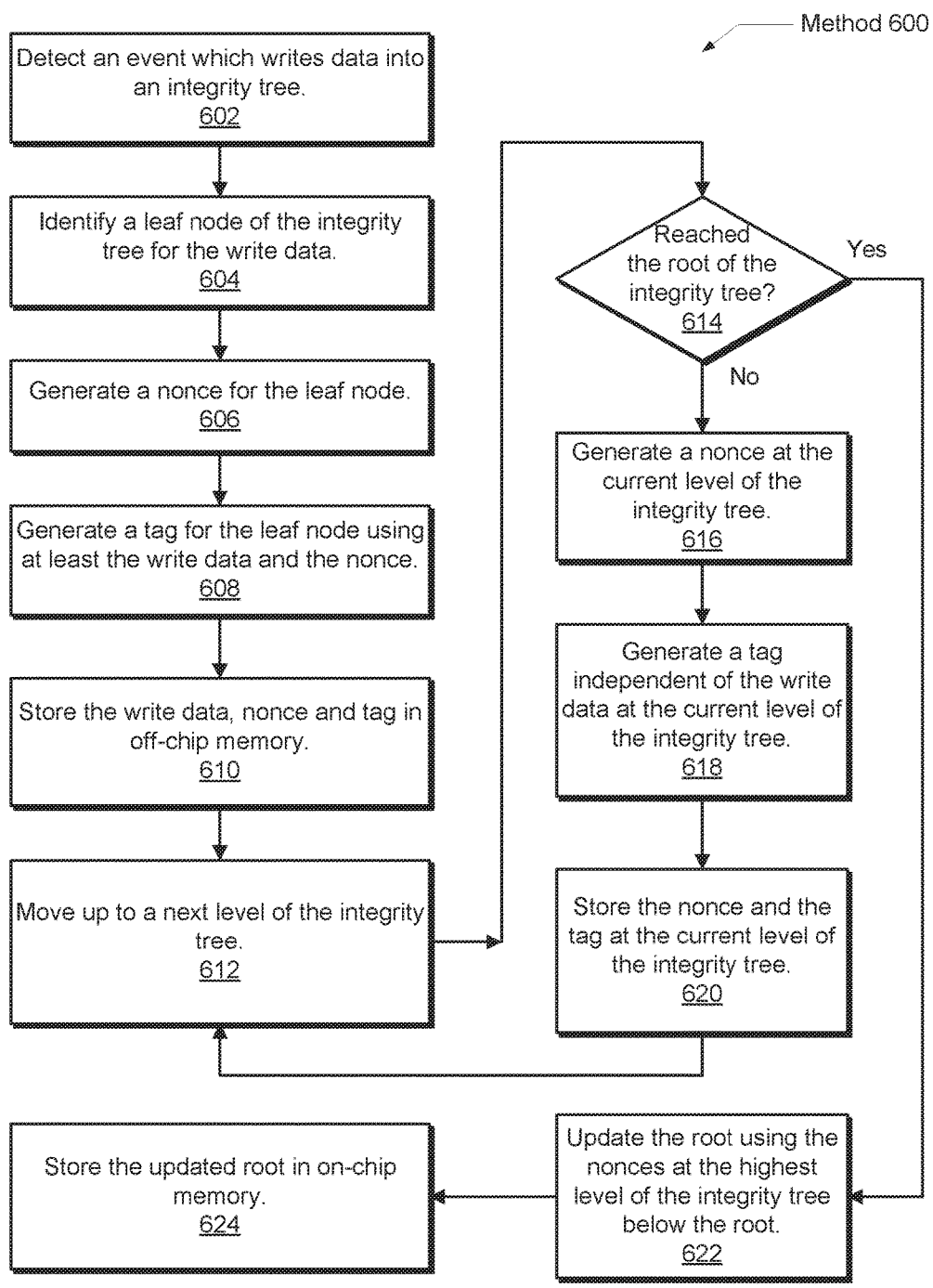
FIG. 6 is a generalized flow diagram illustrating one embodiment of a method for updating an integrity tree.

Turning now to FIG. 6, a generalized flow diagram of one embodiment of a method 600 for updating an integrity tree is shown. Method 600 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In block 602, an event is detected which causes a write of data into an integrity tree. For example, a security processor may have detected an event to update secure data such as financial management data, user communication data, received sensitive data from other people or organizations, secure boot process data and so forth. In block 604, a leaf node at the bottom level of the integrity tree is identified for the write data. In some embodiments, a branch of the integrity tree corresponding to the leaf node is read and verified as part of a write operation. For example, the verification steps described in t11-t16 of FIG. 5 and method 700 in FIG. 7 may be used. If the error detection data, such as one or more of the tags, nonces and the root, passes authentication, then method 600 continues. In block 606, a nonce is generated for the identified leaf node.

In block 608, a tag for the leaf node is generated using at least the write data and the generated nonce. In some embodiments, the generated tag is a MAC tag. In block 610, the write data, the generated nonce and the generated tag are stored in the bottom level of the integrity tree in off-chip memory. In block 612, the hierarchy of the integrity tree is traversed by moving up to a next level of the integrity tree.

If the root of the integrity tree is not reached (conditional block 614), then in block 616, a nonce at the current level of the integrity tree is generated.

At the current level of the integrity tree, in block 618, a tag is generated independent of the write data. In block 620, the nonce and the tag at the current level of the integrity tree are stored in off-chip memory. In some embodiments, a copy of the nonce and the tag is stored in on-chip memory. However, on-chip storage may be limited, so each level of the integrity tree may not have copies stored in the on-chip memory. In some embodiments, one or more copies of the nonce is stored in other levels of the integrity tree other than the current level. Control flow of method 600 then returns to block 612.

If the root of the integrity tree is reached (conditional block 614), then in block 622, the root of the integrity tree is updated using the nonces at the highest level of the integrity tree below the root. In some embodiments, the nonces at the highest tree level below the root, such as nonces n'[0] to n'[7FFF] of FIG. 2, are securely stored in on-chip memory. In such embodiments, a given nonce of these nonces is used for detecting replay attacks rather than the root. Therefore, the root may not be updated (or even maintained) in these embodiments. In block 624, the updated root is stored in on-chip memory. The updated root is inaccessible to malicious attackers as the root is stored in the on-chip memory with a higher security level than off-chip memory. One or more other values may also be selected for secure storage in the on-chip memory 130. Examples of the selected values are similar to the examples described for the selected values at time t2 in the diagram of FIG. 4.

Figure 7:
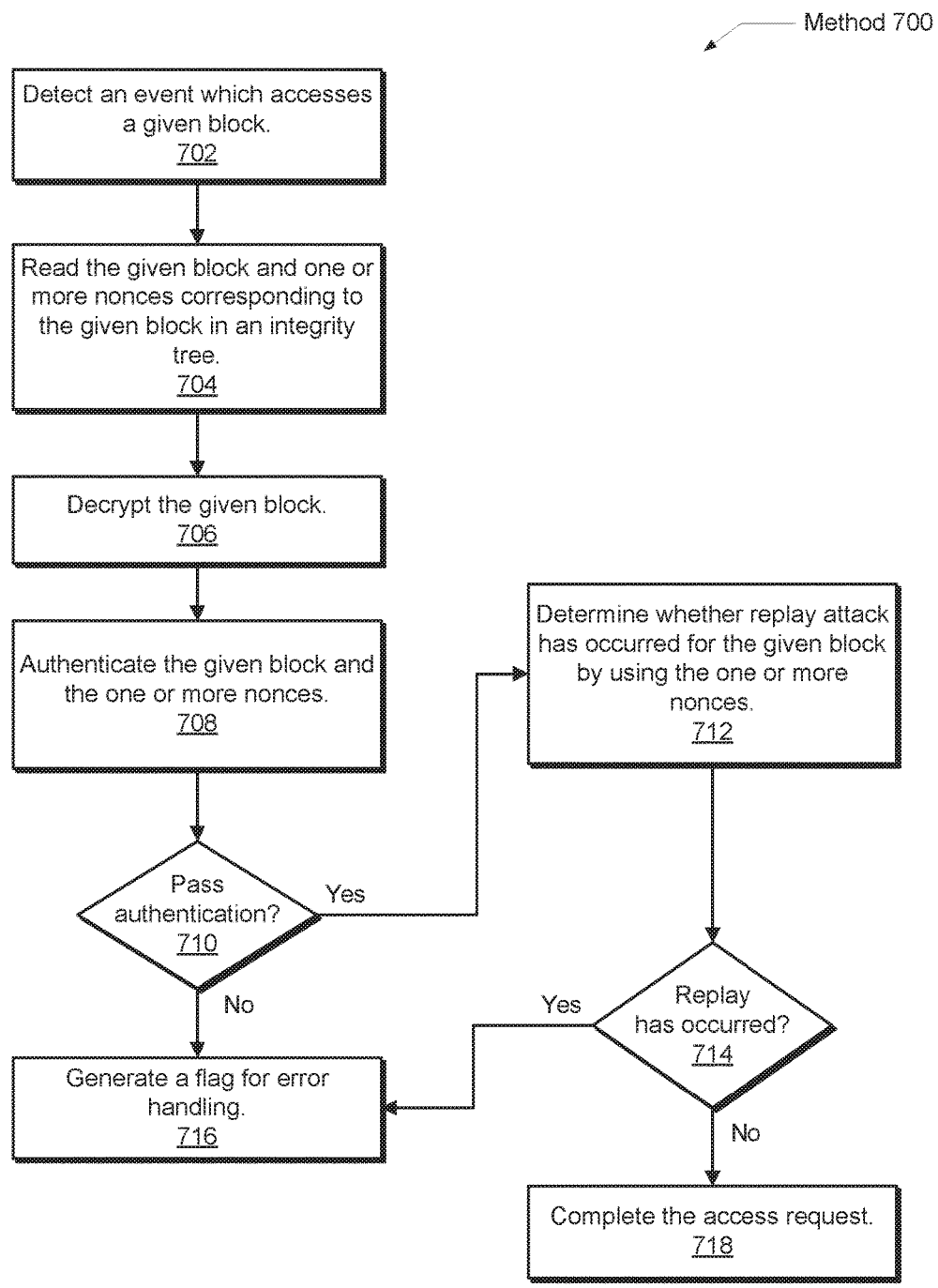
FIG. 7 is a generalized flow diagram illustrating one embodiment of a method for protecting access to sensitive data.

Turning now to FIG. 7, a generalized flow diagram of one embodiment of a method 700 for protecting access to sensitive data is shown. Method 700 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In the embodiment shown, a security processor in block 702 detects an event which accesses a given block in a trusted area in off-chip memory. In some cases, the access is a read of the given block. In other cases, the access is a write of the given block. In block 704, the security processor reads from the off-chip memory the given block and one or more nonces and tags corresponding to the given block in an integrity tree. In block 706, the security processor decrypts at least the given block.

In block 708, the security processor authenticates the given block and the one or more nonces. For example, the security processor may generate one or more tags from the received given block and the received nonces. The security processor may compare the generated tags to the received tags from the off-chip memory. Additionally, the security processor may compare values that should be copies of a same nonce stored in separate levels of the integrity tree. Mismatches indicate data corruption. Matches indicate passed authentication. If the authentication fails (conditional block 710), then in block 716, the security processor generates a flag for error handling.

If the authentication passes (conditional block 710), then in block 712, the security processor determines whether a replay attack has occurred for the given block. The determination may use the one or more received nonces. The nonces are independent of any value within the received given block. In some embodiments, the security processor generates a root, which is the top of the integrity tree, from at least the received nonce. The security processor may compare the generated root to a root stored in on-chip memory. In other embodiments, the nonces at the highest tree level below the root, such as nonces n'[0] to n'[7FFF] are securely stored in the on-chip memory. A given nonce, which corresponds to the given block, from these nonces at the highest tree level below the root is selected for comparison. A mismatch found during the comparison indicates a replay attack occurred. If replay has occurred (conditional block 714), then control flow of method 700 moves to block 716 and the security processor generates a flag for error handling. Otherwise, if replay has not occurred (conditional block 714), then in block 718, the security processor completes the access request.

Figure 8:
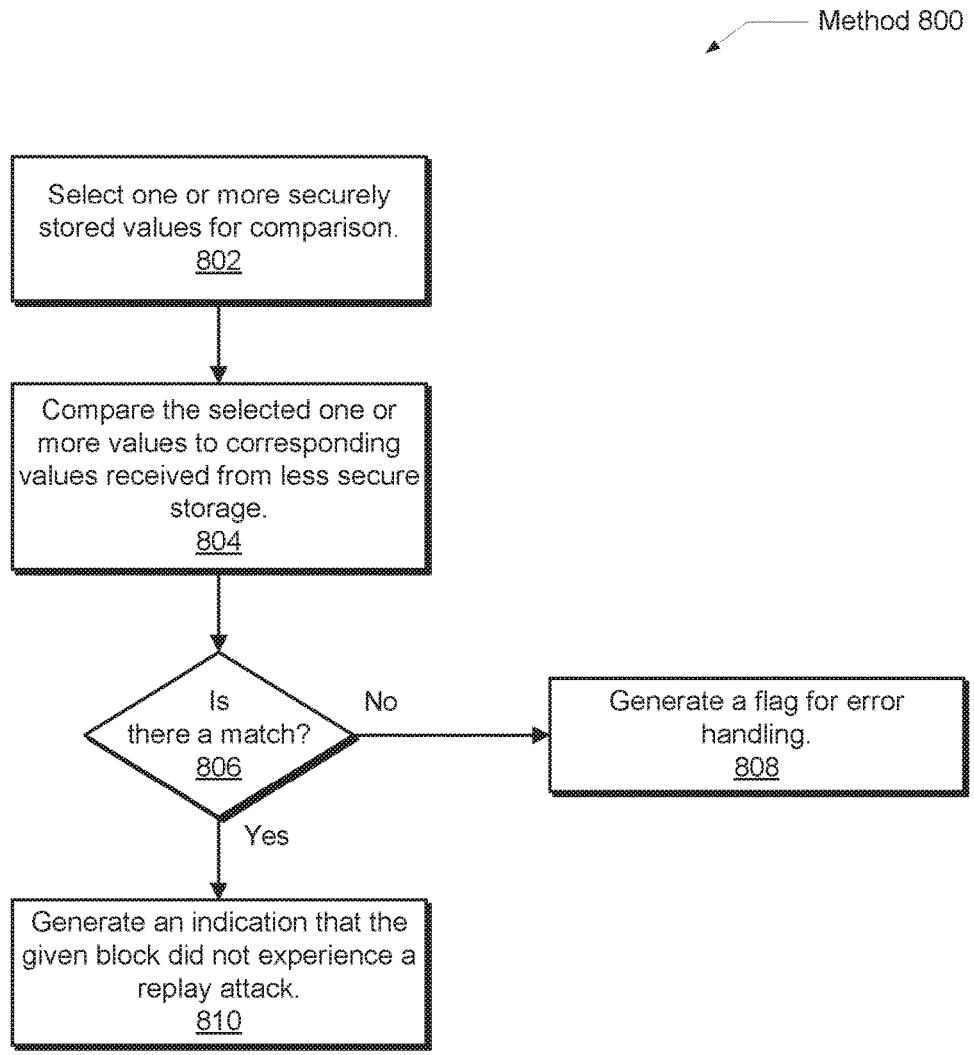
FIG. 8 is a generalized flow diagram illustrating one embodiment of a method for detecting a replay attack.

Turning now to FIG. 8, a generalized flow diagram of one embodiment of a method 800 for detecting a replay attack is shown. Similar to previous methods 600 and 700, method 800 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

In various embodiments, a security processor stores the sensitive data to protect and corresponding error detection values in a particular arrangement determined by an integrity tree. For example, the integrity tree 200 may be used. In block 802, the security processor selects which securely stored values to use for comparisons. In some embodiments, a given nonce from nonces at the highest tree level below the root is selected for comparison. In other embodiments, the root is selected for comparison. In such embodiments, the security processor generates a root based on the nonces at the highest level of the integrity tree below the stored root. At least one nonce may correspond to data read from off-chip memory, whereas the remaining nonces are stored values. For example, the remaining nonces may be stored in on-chip memory. Referring again to the integrity tree 200, a value for the nonce n'[0] may have been read from off-chip memory corresponding to an access request for sensitive data stored in the block c[1]. The value for the nonce n'[0] read from off-chip memory may be combined with the nonces n'[1] to n'[7FFF] in a MAC algorithm.

In block 804, the security processor compares one or more values received from off-chip memory to corresponding securely stored values in the on-chip memory. For example, the generated root may be compared to the root stored in the on-chip memory. In another example, a value that should be a copy of the nonce n'[0] received from the off-chip memory and corresponding to the data block c[1] being accessed is compared to the value that should be a copy of the nonce n'[0] stored in the on-chip memory. If there is a match (conditional block 806), then in block 810, the security processor generates an indication that the given block did not experience a replay attack. An access request for sensitive data may proceed. However, if there is a mismatch (conditional block 806), then in block 808, the security processor generates a flag for error handling.

Referring again to FIG. 1, as described earlier, the microprocessor 100 may enter a powered down or sleep state for reducing power consumption. The security processor 120 may use certain state information in order to access the sensitive data 178*a*-178*c* in the off-chip memory 170 when powered up again after a power down event. During the awakening or exit from the sleep state when the microprocessor 100 powers up again, the security processor 120 may access the sensitive data 178a-178c in the off-chip memory 170. The sensitive data 178a-178c in the off-chip memory 170 may be encrypted using one or more keys that were present in the security processor 120 prior to powering down. In one embodiment, the keys were generated in the security processor 120 responsive to one or more seeds. The seeds may be used to regenerate the keys. In an embodiment, the sensitive data 132 in the on-chip memory 130 may store the seeds.

The security processor 120 may read the seeds in response to power up and may use the seeds to regenerate the keys, thus permitting access to the sensitive data 178a-178c in the off-chip memory 170. In various embodiments, in response to a power up or a return (awakening) to an active state from a disabled state (sleep state), the security processor 120 reads the nonces in the highest tree level below the root 134 and generates a root. The security processor 120 compares the generated root to the stored root 134. If the values don't match, the security processor 120 generates a flag for error handling. The reading of the nonces followed by the generating and the comparing of the roots verifies whether the nonces have been corrupted.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system on a chip comprising:
an on-chip memory to store a first set of nonces at a highest level of an integrity tree that comprises a plurality of nodes, wherein each leaf node of the plurality of nodes stores a block of data, and wherein nonces have been generated independent of any value within any block of data; and
a security processor;
wherein in response to detecting an event which accesses a first block of the integrity tree stored in an off-chip memory, the security processor is configured to:
read the first block and a second set of nonces stored in the off-chip memory;
authenticate both the first block and the second set of nonces; and
in response to determining the first block and the second set of nonces are authenticated:
compare at least a nonce of the first set of nonces with a nonce of the second set of nonces; and
generate an error indication responsive to determining the nonce of the first set of nonces is not the same as the nonce of the second set of nonces.

2. The system on a chip as recited in claim 1, wherein the second set of nonces correspond to a branch of the integrity tree that includes the first block.

3. The system on a chip as recited in claim 1, wherein in response to updating the first block in the off-chip memory, the security processor is configured to update each of the second set of nonces independent of any value within the first block.

4. The system on a chip as recited in claim 1, wherein to authenticate both the first block and the second set of nonces, for each level of the integrity tree, the security processor is configured to:
combine at least one or more nonces of the second set of nonces in an algorithm to produce one or more tags independent of any value within any block of data;
compare the produced one or more tags with one or more tags read from the off-chip memory; and
generate an error indication responsive to determining the produced one or more tags are not the same as the one or more tags read from the off-chip memory.

5. The system on a chip as recited in claim 1, wherein in response to detecting an exit from a sleep state, the security processor is further configured to:
read the first set of nonces from the off-chip memory;
combine the first set of nonces in an algorithm to produce a first root;
compare the first root with a second root previously stored in the on-chip memory before the sleep state, wherein the second root is prevented from being stored in the off-chip memory; and
generate an error indication responsive to determining the first root is not the same as the second root.

6. The system on a chip as recited in claim 1, wherein in response to detecting an event which accesses the first block of the integrity tree stored in the off-chip memory, the security processor is further configured to:
generate a second value by combining at least the first set of nonces in an algorithm, wherein the second value is generated independent of any value within the first block;
compare the second value with a first value previously stored in the on-chip memory; and
generate an error indication responsive to determining the second value is not the same as the first value.

7. The system on a chip as recited in claim 1, wherein to authenticate both the first block and the second set of nonces, the security processor is configured to:
combine at least the first block and one or more nonces of the second set of nonces in an algorithm to produce a tag;
compare the produced tag with a tag read from the off-chip memory; and
generate an authentication indication responsive to determining the produced tag is the same as the tag read from the off-chip memory.

8. The system on a chip as recited in claim 6, wherein the second value is prevented from being stored in the off-chip memory.

9. A method comprising:
storing in an on-chip memory a first set of nonces at a highest level of an integrity tree that comprises a plurality of nodes, wherein each leaf node of the plurality of nodes stores a block of data, and wherein nonces have been generated independent of any value within any block of data;
in response to detecting an event which accesses a first block of the integrity tree stored in an off-chip memory:
reading the first block and a second set of nonces stored in the off-chip memory;
authenticating both the first block and the second set of nonces; and
in response to determining the first block and the second set of nonces are authenticated:
comparing at least a first nonce of the second set of nonces with a second nonce of the first set of nonces; and
generate an error indication responsive to determining the first nonce is not the same as the second nonce.

10. The method as recited in claim 9, wherein the second set of nonces correspond to a branch of the integrity tree that includes the first block.

11. The method as recited in claim 9, wherein in response to updating the first block in the off-chip memory, the method further comprises updating each of the second set of nonces independent of any value within the first block.

12. The method as recited in claim 9, wherein to authenticate both the first block and the second set of nonces, for each level of the integrity tree, the method further comprises:
combining at least one or more nonces of the second set of nonces in an algorithm to produce one or more tags independent of any value within any block of data;
comparing the produced one or more tags with one or more tags read from the off-chip memory; and
generating an error indication responsive to determining the produced one or more tags are not the same as the one or more tags read from the off-chip memory.

13. The method as recited in claim 9, wherein in response to detecting an exit from a sleep state, the method further comprises:
reading the first set of nonces from the off-chip memory;
combining the first set of nonces in an algorithm to produce a first root;
comparing the first root with a second root previously stored in the on-chip memory before the sleep state, wherein the second root is prevented from being stored in the off-chip memory; and
generate an error indication responsive to determining the first root is not the same as the second root.

14. The method as recited in claim 9, wherein in response to detecting an event which accesses the first block of the integrity tree stored in the off-chip memory, the method further comprises:
generating a second value by combining at least the first set of nonces in an algorithm, wherein the second value is generated independent of any value within the first block;
comparing the second value with a first value previously stored in the on-chip memory; and
generating an error indication responsive to determining the second value is not the same as the first value.

15. The method as recited in claim 14, wherein to authenticate both the first block and the second set of nonces, the method further comprises:
combining at least the first block and one or more nonces of the second set of nonces in an algorithm to produce a tag;
comparing the produced tag with a tag read from the off-chip memory; and
generating an authentication indication responsive to determining the produced tag is the same as the tag read from the off-chip memory.

16. The method as recited in claim 14, further comprises preventing the second value from being stored in the off-chip memory.

17. A security processor comprising:
an interface coupled to an on-chip memory configured to store a first set of nonces at a highest level of an integrity tree that comprises a plurality of nodes, wherein each leaf node of the plurality of nodes stores a block of data, and wherein nonces have been generated independent of any value within any block of data;
an interface to a memory controller coupled to off-chip memory configured to store the plurality of blocks;
control logic, wherein in response to detecting an event which accesses a first block of the integrity tree stored in the off-chip memory, the control logic is configured to:
read the first block and a second set of nonces stored in the off-chip memory;
authenticate both the first block and the second set of nonces; and
in response to determining the first block and the second set of nonces are authenticated:
compare at least a nonce of the first set of nonces with a nonce of the second set of nonces; and
generate an error indication responsive to determining the nonce of the first set of nonces is not the same as the nonce of the second set of nonces.

18. The security processor as recited in claim 17, wherein the second set of nonces correspond to a branch of the integrity tree that includes the first block.

19. The security processor as recited in claim 17, wherein in response to updating the first block in the off-chip memory, the control logic is configured to update each of the second set of nonces independent of any value within the first block.

20. The security processor as recited in claim 17, wherein to authenticate both the first block and the second set of nonces, for each level of the integrity tree, the control logic is configured to:
combine at least one or more nonces of the second set of nonces in an algorithm to produce one or more tags independent of any value within any block of data;
compare the produced one or more tags with one or more tags read from the off-chip memory; and
generate an error indication responsive to determining the produced one or more tags are not the same as the one or more tags read from the off-chip memory.

* * * * *